June 17, 1941.   L. W. MORTON   2,246,181
ELECTRIC VALVE CONTROL CIRCUIT
Filed Dec. 5, 1940

Inventor:
Lysle W. Morton,
by Harry E. Dunham
His Attorney.

Patented June 17, 1941

2,246,181

UNITED STATES PATENT OFFICE 2,246,181

ELECTRIC VALVE CONTROL CIRCUIT

Lysle W. Morton, Schenectady, N. Y., assignor to General Electric Company, a corporation of New York Application December 5, 1940, Serial No. 368,670

7 Claims. (Cl. 175—363)

My invention relates to electric control circuits and more particularly to electric circuits for controlling the operation of electric valve means of the type employing an ionizable medium.

In electric valve translating systems, it is frequently desirable to operate a pair of electric valve means in parallel relationship in order to meet the requirements of a particular load. Electric valves of the type employing an ionizable medium afford distinct advantages, particularly where the magnitude of the current demanded by the load circuit is relatively large. In accordance with the teachings of my invention described hereinafter, I provide new and improved electric control circuits wherein electric valve apparatus of this nature may be more effectively operated in parallel.

It is an object of my invention to provide new and improved electric control circuits for electric valve apparatus of the type employing an ionizable medium capable of supporting an arc discharge.

It is another object of my invention to provide new and improved control systems for electric valve translating apparatus wherein electric valve means of the type employing an ionizable medium may be operated in parallel relationship, and wherein the valves are controlled so that the parallel operating electric valves conduct equal amounts of current.

It is a further object of my invention to provide new and improved electric control circuits for electric valve apparatus of the type employing an ionizable medium and using control members of the immersion-ignitor type.

Briefly stated, in the illustrated embodiments of my invention I provide new and improved electric control circuits for electric translating apparatus of the type comprising an immersion-ignitor control member and employing a medium capable of supporting an arc discharge. The anode-cathode circuits of pairs of electric valves are connected so that the pairs of electric valves conduct current in parallel relationship, and the control members of the parallel operating electric valves are energized simultaneously by means of excitation circuits comprising saturable inductive devices which produce voltages of peaked wave form. Means are provided to assure that the peaked voltages are maintained in exact phase coincidence so that the electric valves conduct equal amounts of current.

Figure 1:
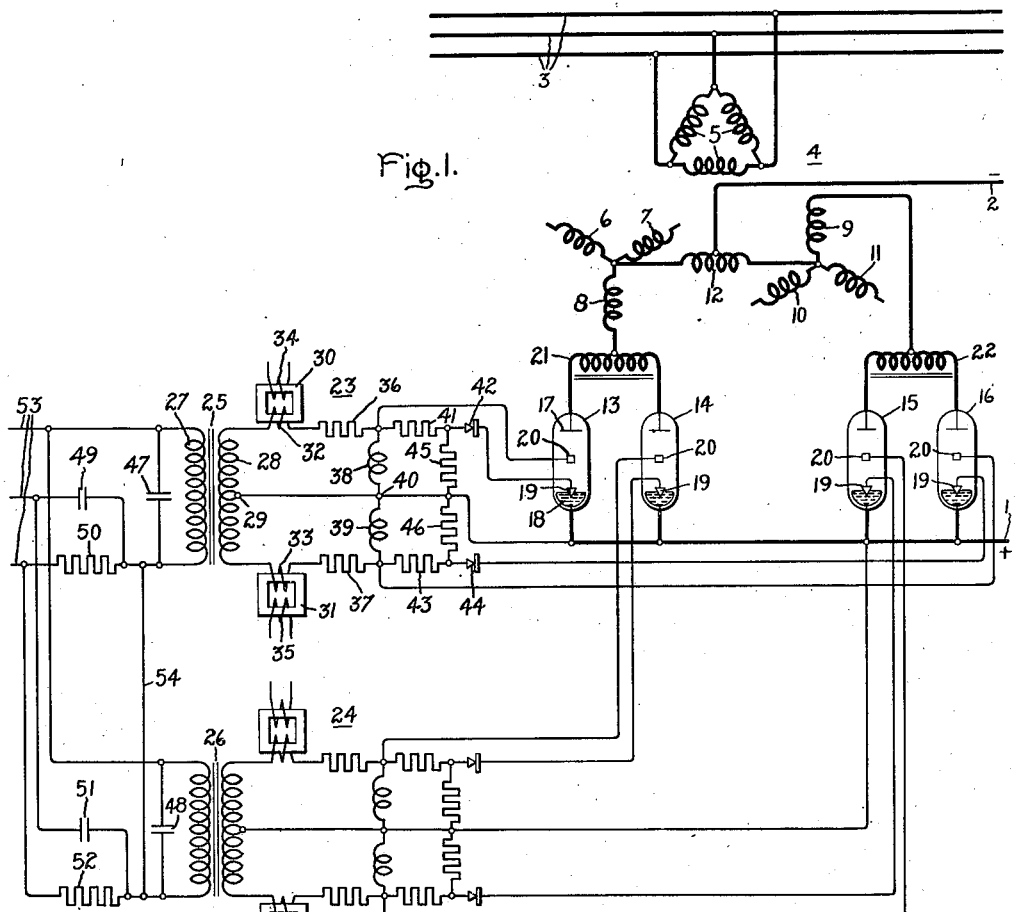
Figure 2:
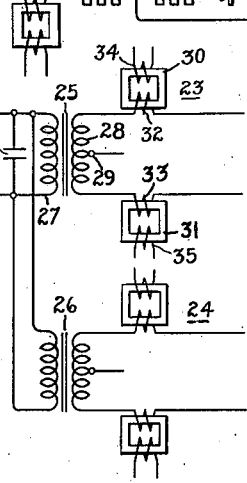

For a better understanding of my invention, reference may be had to the following description taken in connection with the accompanying drawing, and its scope will be pointed out in the appended claims. Fig. 1 diagrammatically illustrates an embodiment of my invention as applied to a double three-phase electric valve translating system for energizing a direct current load circuit from an alternating current supply circuit, and wherein each phase of the translating system is provided with a pair of electric valve means which are intended to operate in parallel. Fig. 2 is a modification of the arrangement shown in Fig. 1.

Referring now more particularly to the embodiment of my invention shown in Fig. 1, a direct current load circuit, comprising a positive conductor 1 and a negative conductor 2, is energized from an alternating current supply circuit 3 through electric translating apparatus comprising a transformer 4 including a plurality of primary windings 5 and two groups of secondary windings 6, 7, 8 and 9, 10, 11. The two groups of secondary windings are interconnected through a suitable interphase transformer 12 so that the two three-phase groups of secondary windings operate as a double three-phase system.

To each of the secondary windings 6—11 I connect a pair of electric valve means which are intended to operate in parallel relationship. In the embodiment of my invention illustrated in Fig. 1, electric valve means 13 and 14 are shown connected to be energized from secondary winding 8, and electric valve means 15 and 16 are shown as connected to the secondary winding 9. It will be understood that similar groups of electric valve means are connected to the other secondary windings, although not shown. The electric valve means 13—16 are of the type employing an ionizable medium capable of supporting an arc discharge and each comprises an anode 17, a cathode 18, an immersion-ignitor control member 19 and a transfer anode or auxiliary electrode 20 which relieves the duty imposed upon the associated control member 19. The control members 19 are of the type comprising a material having a relatively large specific electrical resistivity as compared with that of the associated mercury pool cathode 18 and are preferably constructed of a material such as boron carbide or silicon carbide, or a similar material. An extremity of each of the control members 19 extends into the mercury of the associated cathode, and the mercury vapor is ionized by the transmission of a sufficient current through the control member which creates a cathode spot on the surface of the mercury.

Suitable current dividing means, such as current dividing reactors 21 and 22, are associated with the anode-cathode circuits of electric valve means 13 and 14, and 15 and 16, respectively, so that the electric valve means 13 and 14, and 15 and 16 conduct current in parallel relationship.

I employ excitation circuits for energizing the control members 19 of electric valve means 13–16, inclusive, which are of the type disclosed and claimed in an application for Letters Patent Serial No. 333,187 of Ernst F. W. Alexanderson and Albert H. Mittag, filed May 3, 1940. Excitation circuits 23 and 24 are of similar construction and arrangement and comprise transformers 25 and 26, respectively, each of which includes a primary winding 27 and a secondary winding 28 provided with a tap or connection 29 which is intermediate the terminals of the secondary windings 28. Inasmuch as the excitation circuits 23 and 24 are of similar construction and arrangement, only excitation circuit 23 will be considered in detail. In order to produce periodic voltages of peaked wave form and preferably alternating voltages of peaked wave form so that the electric valve means in different parallel groups may be rendered conductive during intervals or at times displaced 180 electrical degrees, excitation circuit 23 is arranged to energize control members 19 of both electric valves 13 and 16. Inasmuch as secondary phase windings 8 and 9 are displaced 180 electrical degrees, it will be appreciated that these electric valves conduct current during intervals displaced 180 electrical degrees. As an agency for producing periodic voltages of peaked wave form, I employ saturable inductive devices 30 and 31 having windings 32 and 33, respectively, connected in series relation with secondary winding 28 of transformer 25. Each of the saturable inductive devices 30 and 31 may include means, such as control windings 34 and 35, for establishing within the core members of the inductive reactances unidirectional components of flux so that the windings are unidirectionally saturable. Of course, the energization of windings 34 and 35 may be varied in accordance with the teachings of the above-identified patent application Serial No. 333,187 in order to control the phase of the voltages of peaked wave form transmitted to the control members 19. Resistances 36 and 37 and inductances 38 and 39 are connected in series relation with windings 32 and 33, respectively, and the common juncture 40 of the inductances is connected to the intermediate connection 29. The voltages produced across the inductances 38 and 39 are of peaked wave form and are transmitted to the control members 19 of electric valve means 13 and 16 through circuits including resistance 41 and unidirectional conducting device 42 and a resistance 43 and unidirectional conducting device 44, respectively. Resistances 45 and 46 may be connected between the junctures of resistances 41 and 43 and unidirectional conducting devices 42 and 44, respectively, and the intermediate connection 29 in order to provide symmetrical discharge paths for inductances 38 and 39, thereby limiting the magnitude of the negative portions of the control voltages impressed on control members 19.

Auxiliary electrodes 20 of electric valve means 13 and 16 are preferably connected to the common juncture of resistances 36 and 41, and 37 and 43, respectively, thereby serving to effect transfer of the excitation of control member current from the control members 19 upon initiation of arc discharges within the electric valves.

Suitable phase shifting capacitances 47 and 48 are connected across the primary windings of transformers 25 and 26 and cooperate with capacitance 49 and resistance 50, and capacitance 51 and resistance 52, respectively, to produce a phase displacement of the voltages impressed across the primary windings of these transformers upon variation in the amount of lagging reactive current transmitted to the excitation circuits 23 and 24. These elements constitute phase shifting means which are responsive to the amount of lagging reactive current demanded by the excitation circuits; and the amount of the lagging current demanded by the excitation circuits is determined by the magnetization of saturable inductive devices 30 and 31. Excitation circuits 23 and 24 are energized from a suitable source of alternating current, such as a polyphase alternating current circuit 53. Of course, it is to be understood that the excitation circuits may be energized from the alternating current supply circuit 3, if desired.

The control member 19 of the electric valve means 14 is energized from the upper portion of the excitation circuit 24, and the control voltages impressed on control members 19 of electric valve means 13 and 14 are exactly in phase so that the electric valve means 13 and 14 are rendered conductive simultaneously and conduct equal amounts of current. I have found that due to manufacturing inaccuracies in building capacitances that the capacitive reactances of these devices vary substantially so that in commercial applications the voltages of peaked wave form, which are intended to be exactly in phase, frequently depart from the position of phase coincidence by an amount or phase angle sufficient to cause an appreciable difference in the current conducted by parallel-operating electric valve means. In order to assure that the voltages of peaked wave form supplied to control members 19 are in exact phase coincidence, I provide suitable equalizing means, such as a conductor 54, connected between corresponding points of the phase shifting apparatus, or corresponding points of the excitation circuits, or corresponding points of the transformers 25 and 26, to assure that the voltages are maintained in this desired relationship. By interconnecting the circuits in this manner, I provide means for compensating for inaccuracies in the capacitance or capacitive reactances of the elements used in the phase shifting portion of the system.

The operation of the embodiment of my invention illustrated in Fig. 1 of the accompanying drawing will be explained by considering the system when it is operating as a double three-phase rectifier to energize the direct current load circuit from the alternating current supply circuit 3. Inasmuch as the interphase transformer 12 is employed, each phase or each secondary winding conducts current for 120 electrical degrees during each cycle of voltage of the supply circuit, but for only 60 electrical degrees with any one other secondary winding in the other group. The pairs of electric valves connected to each of the parallel circuits, for example the pairs 13, 14 and 15, 16, conduct current for 120 electrical degrees during each cycle of voltage. By virtue of the reactors 21 and 22 these electric valve means conduct current in parallel relationship and the control members 19 are energized at the same instants during the half cycles of applied anode-cathode voltage. Each electric valve means conducts exactly the same amount of current.

The excitation circuits 23 and 24 produce periodic voltages of peaked wave form having positive portions of substantially greater magnitude and shorter duration than the negative portions. The voltage impressed on the control members 19 is substantially unidirectional due to the operation of the unidirectional conducting devices 42 and 44. As soon as arc discharges are established within the electric valve means, energizing current or excitation current is transferred to the auxiliary electrodes 20, thereby relieving the duty imposed on the control members 19. The phase of the voltage supplied to the control members 19 may be controlled or adjusted by variably energizing windings 34 and 35 of the inductive devices 30 and 31. There is also an additional shift in phase of the voltage provided by the transmission of the lagging reactive current to the excitation circuits by virtue of the operation of the phase shifting apparatus including capacitances 47, 48, capacitances 49, 51, and resistances 50 and 52.

The equalizing means including conductor 54 maintains the voltages impressed on control members 19 of electric valve means 13 and 14 exactly in phase coincidence. This conductor serves as a means for transmitting sufficient current between the respective excitation circuits or the phase shifting means to equalize any difference in phase relationship. In this manner, the parallel operating electric valve means, such as electric valve means 13 and 14, or 15 and 16, are rendered conductive at exactly the same instants during each cycle and, hence, equal amounts of current.

Fig. 2 represents a modification of the arrangement shown in Fig. 1 and corresponding elements have been assigned like reference numerals. In the arrangement of Fig. 2, a single phase-shifting network is employed between the source of current for the excitation circuits and the transformers 25 and 26. The primary windings are connected in parallel and thereby serve as equalizing means between the respective excitation circuits to assure that the voltages impressed on the control members of parallel operating electric valves are maintained in exact phase coincidence. The system shown in Fig. 2 operates in substantially the same manner as that explained above in connection with Fig. 1.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a load circuit, electric translating apparatus connected between said circuits and comprising a pair of electric valve means employing an ionizable medium capable of supporting an arc discharge and each having an anode, a cathode and a control member of the immersion-ignitor type, means for connecting the anode-cathode circuits of said electric valve means so that said electric valve means operate in parallel, a pair of excitation circuits for energizing said control members simultaneously and each comprising means including a saturable inductive device for producing a periodic voltage of peaked wave form, a source of alternating current for energizing said pair of excitation circuits, phase shifting means connected between said source and said excitation circuits for producing a shift in the phase of the voltage supplied to said excitation circuits in accordance with the current demanded by the excitation circuits, and equalizing means connected between corresponding points of said excitation circuits to maintain the voltages of peaked wave form produced by said excitation circuits exactly in phase so that the electric valve means conduct equal amounts of current.

2. In combination, an alternating current circuit, a load circuit, electric translating apparatus connected between said circuits and comprising a pair of electric valve means employing an ionizable medium capable of supporting an arc discharge and each having an anode, a cathode and a control member of the immersion-ignitor type, means for connecting the anode-cathode circuits of said electric valve means so that said electric valve means operate in parallel, a pair of excitation circuits for energizing said control member simultaneously and each comprising a transformer and means including a saturable inductive device for impressing a voltage of peaked wave form on the control member of the associated electric valve means, a source of alternating current for energizing said pair of excitation circuits, phase shifting means connected between said source and the transformers for shifting the phase of the voltage supplied thereto in response to the current conducted by the excitation circuits, and equalizing means connected between corresponding points of the transformers to maintain the voltages of peaked wave form produced by said excitation circuits exactly in phase so that said electric valve means conduct equal amounts of current.

3. In combination, an alternating current circuit, a load circuit, electric translating apparatus connected between said circuits and comprising a pair of electric valve means employing an ionizable medium capable of supporting an arc discharge and each having an anode, a cathode and a control member of the immersion-ignitor type, means for connecting the anode-cathode circuits of said electric valve means so that said electric valve means operate in parallel, a pair of excitation circuits each comprising a transformer including a primary winding and each comprising means including a saturable inductive device for impressing a voltage of peaked wave form on the control member of the associated electric valve means, a source of alternating current for energizing said excitation circuits, phase shifting means connected between said source and said transformers for shifting the phase of the voltage supplied thereto in accordance with the current demanded by said excitation circuits, and means for connecting the primary windings of said transformers in parallel to maintain the voltages of peaked wave produced by said excitation circuits exactly in phase so that said electric valve means conduct equal amounts of current.

4. In combination, an alternating current circuit, a load circuit, electric translating apparatus connected between said circuits and comprising a pair of electric valve means employing an ionizable medium capable of supporting an arc discharge and each having an anode, a cathode and a control member of the immersion-ignitor type and a control electrode, means for connecting the anode-cathode circuits of said electric valve means so that said electric valve means operate in parallel, a pair of excitation circuits for energizing said control members simultaneously and each comprising in series relation a saturable inductive device and an impedance element, means connected between each of the excitation circuits for impressing a voltage of peaked wave form on the control member of the associated electric valve means, means for connecting the control electrodes to the associated excitation circuits so that current is transferred from said control member to said control electrode as soon as arc discharges are established within the electric valve means, a source of alternating current for energizing said pair of excitation circuits, a pair of phase shifting means each connected between said source and a different one of said excitation circuits for shifting the phase of the voltage supplied to said excitation circuits in accordance with the current demanded by each of the excitation circuits, and equalizing means connected between corresponding points of said phase shifting means to maintain the voltages of peaked wave form produced by said excitation circuits exactly in phase so that said electric valve means conduct equal amounts of current.

5. In combination, an alternating current circuit, a load circuit, electric translating apparatus connected between said circuits and comprising a pair of electric valve means employing an ionizable medium capable of supporting an arc discharge and each having an anode, a cathode, a control member of the immersion-ignitor type and a control electrode, means for connecting the anode-cathode circuits of said pair of electric valve means so that said pair of electric valve means conduct current in parallel, a pair of excitation circuits for energizing said control members simultaneously and each comprising means for producing a periodic voltage of peaked wave form, means for connecting the control electrodes to said excitation circuits so that current is transferred from said control members to said control electrodes as soon as arc discharges are established within the electric valve means, a source of alternating current for energizing said pair of excitation circuits, a plurality of phase shifting means each connected between said source and a different one of said excitation circuits for shifting the phase of the voltage supplied to said excitation circuits in accordance with the current demanded by each of the excitation circuits, and equalizing means connected between corresponding points of said phase shifting means to maintain the voltages of peaked wave form produced by said excitation circuits exactly in phase.

6. In combination, an alternating current circuit, a load circuit, electric translating apparatus connected between said circuits and comprising a pair of electric valve means employing an ionizable medium capable of supporting an arc discharge and each having an anode, a cathode, a control member of the immersion-ignitor type and a control electrode, means for connecting the anode-cathode circuits of said pair of electric valve means in parallel, a pair of excitation circuits for energizing simultaneously said control members and each comprising a transformer, a saturable inductive device and an impedance element, means comprising a unidirectional conducting device for connecting the associated control member to the impedance element so that a unidirectional voltage of peaked wave form is supplied to said control member, means for connecting the control electrodes to the associated excitation circuits so that current is transferred from said control members to said control electrodes as soon as arc discharges are established within the electric valve means, a source of alternating current for energizing said pair of excitation circuits, a plurality of phase shifting means each connected between said source and a different one of said transformers for shifting the phase of the voltage supplied to said transformers in accordance with the current demanded by each of the excitation circuits, and equalizing means connected between corresponding points of said phase shifting means to maintain the voltages of peaked wave form produced by each of said excitation circuits exactly in phase.

7. In combination, an alternating current circuit, a load circuit, electric translating apparatus connected between said circuits and comprising two pairs of electric valve means each electric valve means employing an ionizable medium capable of supporting an arc discharge and having an anode, a cathode, a control member of the immersion-ignitor type and a control electrode, the pairs of electric valve means being arranged to conduct current during intervals displaced 180 electrical degrees, means for connecting the anode-cathode circuits of each pair of electric valve means so that each pair conducts current in parallel, a pair of excitation circuits for energizing simultaneously the control members of each pair of electric valve means, each of said excitation circuits comprising means for impressing on the control members periodic voltages of peaked wave form, means for connecting the control electrodes to the associated excitation circuits so that current is transferred from said control members to said control electrodes as soon as arc discharges are established within the electric valve means, a source of alternating current for energizing said pair of excitation circuits, a plurality of phase shifting means each connected between said source and a different one of said excitation circuits for shifting the phase of the voltage supplied to said excitation circuits in accordance with the current demanded by each of the excitation circuits, and equalizing means connected between corresponding points of said phase shifting means to maintain the voltages of peaked wave form produced by each of said excitation circuits exactly in phase.

LYSLE W. MORTON.